(12) United States Patent
Espinas et al.

(10) Patent No.: US 11,494,551 B1
(45) Date of Patent: Nov. 8, 2022

(54) FORM FIELD PREDICTION SERVICE

(71) Applicant: Esker, S.A., Lyons (FR)

(72) Inventors: Jérémy Michel Carlo Espinas, Lyons (FR); Jean-Jacques Yves Bérard, Villeurbanne (FR)

(73) Assignee: Esker, S.A., Lyons (FR)

( * ) Notice: Subject to any disclaimer, the term of this patent is extended or adjusted under 35 U.S.C. 154(b) by 0 days.

(21) Appl. No.: 17/384,004

(22) Filed: Jul. 23, 2021

(51) Int. Cl.
*G06F 17/10* (2006.01)
*G06F 40/174* (2020.01)
*G06F 3/04842* (2022.01)
*G06F 40/30* (2020.01)
*G06N 20/00* (2019.01)
*G06V 30/412* (2022.01)

(52) U.S. Cl.
CPC ........ *G06F 40/174* (2020.01); *G06F 3/04842* (2013.01); *G06F 40/30* (2020.01); *G06N 20/00* (2019.01); *G06V 30/412* (2022.01)

(58) Field of Classification Search
CPC .... G06F 40/174; G06F 40/30; G06F 3/04842; G06N 20/00; G06V 30/412
See application file for complete search history.

(56) References Cited

U.S. PATENT DOCUMENTS

| | | | | |
|---|---|---|---|---|
| 7,660,779 B2 * | 2/2010 | Goodman | ............. | G06F 40/174 715/224 |
| 7,890,442 B2 * | 2/2011 | Weir | ...................... | G06N 7/005 706/45 |
| 8,234,561 B1 * | 7/2012 | Bourdev | ................. | G06F 40/30 715/224 |
| 10,599,760 B2 | 3/2020 | Dua et al. | | |
| 10,614,266 B2 | 4/2020 | Dakin et al. | | |

(Continued)

FOREIGN PATENT DOCUMENTS

| | | | | | |
|---|---|---|---|---|---|
| CN | 102184204 | B | * | 3/2013 | |
| CN | 110084653 | A | * | 8/2019 | ............. G06N 20/20 |

(Continued)

OTHER PUBLICATIONS

Bose, Joy. "Field Label Prediction for Autofill in Web Browsers." arXiv preprint arXiv:1912.08809 (2019). (Year: 2019).*

(Continued)

*Primary Examiner* — Shahid K Khan
(74) *Attorney, Agent, or Firm* — Michael Best & Friedrich LLP

(57) ABSTRACT

Processing a first document using a first service that includes a first machine learning model. One embodiment provides a method that includes receiving, over a network, the first document including a first form field and identifying a first value associated with a first entity. The method also includes obtaining a first subset of documents from the first service, analyzing, using the first machine learning model, the first subset of documents to extract a second document including a first value and a second value, automatically populating the first form field with the first value or the second value, and providing, via a graphical user interface, the first document to a user to be validated. The method also includes saving a validated first document to a database, transmitting the validated first document to a second service, and updating the first machine learning model with the validated first document.

20 Claims, 7 Drawing Sheets

(56) References Cited

U.S. PATENT DOCUMENTS

| | | |
|---|---|---|
| 11,132,407 B2* | 9/2021 | Sage ................... G06F 16/93 |
| 2004/0111727 A1* | 6/2004 | Schwarzbauer ........ G06F 11/36 |
| | | 719/310 |
| 2013/0218872 A1* | 8/2013 | Jehuda ................ G06F 16/335 |
| | | 707/722 |
| 2015/0248391 A1 | 9/2015 | Watanabe |
| 2015/0317296 A1* | 11/2015 | Vohra ................... G06F 16/93 |
| | | 715/221 |
| 2017/0046622 A1* | 2/2017 | Gaither ............... G06F 40/247 |
| 2017/0161375 A1* | 6/2017 | Stoica ................. G06F 16/353 |
| 2017/0323233 A1* | 11/2017 | Bencke ............ G06Q 10/0633 |
| 2019/0155894 A1* | 5/2019 | Gandhi ............... G06F 40/106 |
| 2020/0151591 A1* | 5/2020 | Li ............................ G06N 3/08 |
| 2021/0004584 A1 | 1/2021 | Bildner et al. |

FOREIGN PATENT DOCUMENTS

| | | | | |
|---|---|---|---|---|
| FR | 3092683 A1 * | 8/2020 | ......... | G06F 21/6245 |
| WO | 2018189589 A1 | 10/2018 | | |

OTHER PUBLICATIONS

Aye, Gareth Ari, Seohyun Kim, and Hongyu Li. "Learning autocompletion from real-world datasets." 2021 IEEE/ACM 43rd International Conference on Software Engineering: Software Engineering in Practice (ICSE-SEIP). IEEE, 2021. (Year: 2021).*

Hermens et al., "A Machine-Learning Apprentice for the Completion of Repetitive Forms", IEEE Expert, May 1993, 13 pages.

* cited by examiner

FORM FIELD PREDICTION SERVICE

BACKGROUND

Embodiments relate to the automatic population of form fields in a document using a machine learning model.

SUMMARY

It is common for businesses to employ digital business solutions for streamlining day-to-day operations. All businesses deal with suppliers and customers, meaning the operations of the business need to be organized. For example, businesses rely on multiple suppliers, each with their own accounts payable, and multiple customers, each with their own accounts receivable. There is a desire to accurately automate the processing of the numerous documents that are a product of operating a business digitally.

Currently, when businesses digitally receive documents from suppliers and customers, they are required to populate multiple form fields in a document. In some instances, the document may include multiple pages, each page with multiple form fields. Often, the documents are similar to documents that the business has already dealt with, such that the process of populating the form fields is repetitive and additionally, may result in human error by an employee of the business inadvertently incorrectly copying values from one document to the next. There is a need to accurately automate the process of populating form fields in a document received by a business. One solution is to use a machine learning model, that is trained using documents the business has already dealt with and considered to be validated, to populate the form fields of a document received by the business. Accordingly, a system that automatically populates the form fields of a document using a machine learning model is useful.

For example, one embodiment provides a method of processing a first document using a first service including a first machine learning model. The method includes receiving, over a network, the first document. The first document includes a first form field. The method includes identifying a first value associated with the first entity. The method also includes obtaining a first subset of documents from the first service. Each document in the first subset of documents contains the first value. The method also includes analyzing, using the first machine learning model, the first subset of documents to extract a second document. The second document includes a second form field containing the first value and a third form field containing a second value. The method includes automatically populating the first form field with one selected from the group of the first value and the second value. The method includes providing, via a graphical user interface, the first document to a user to be validated. The method also includes saving, in response to the first document being validated, a validated first document to a database. The method includes transmitting the validated first document to a second service. The method also includes in response to transmitting the validated first document to the second service, updating, based on a parameter, the first machine learning model with the validated first document.

Another embodiment provides a system for processing a first document using a first service including a first machine learning model. The system includes an electronic processor that is configured to receive, over a network, the first document. The first document includes a first form field containing a first value and a second form field not containing a value. The electronic processor is also configured to extract the first value from the first form field and obtain a first subset of documents from the first service. Each document included in the first subset of documents contains the first value. The electronic processor is also configured to analyze, using the first machine learning model, the first subset of documents to extract a second document. The second document includes a third form field containing the first value and a fourth form field containing a second value. The electronic processor is configured to automatically populate the second form field with the second value, provide, via the graphical user interface, the first document to a user to be validated, save, in response to the first document being validated, a validated first document to a database, and transmit the validated first document to a second service. The electronic processor is also configured to, in response to transmitting the validated first document to the second service, update, based on a parameter, the first machine learning model with the validated first document.

Another embodiment provides a non-transitory computer-readable medium comprising instructions that, when executed by an electronic processor, causes the electronic processor to perform a set of operations. The set of operations includes identifying a first value associated with the first entity. The set of operations also includes obtaining a first subset of documents from a first service. Each document included in the first subset of documents contains the first value. The set of operations includes analyzing, using a first machine learning model, the first subset of documents to extract a second document. The second document includes a second form field containing the first value and a third form field containing a second value. The set of operations also includes automatically populating the first form field with one selected from the group of the first value and the second value. The set of operations includes providing, via a graphical user interface, the first document to a user to be validated. The set of operations includes saving, in response to the first document being validated, a validated first document to a database. The set of operations includes transmitting the validated first document to a second service. The set of operations also includes, in response to transmitting the validated first document to the second service, updating, based on a parameter, the first machine learning model with the validated first document.

Other aspects, features, and embodiments will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Further, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. In addition, some embodiments described herein may include one or more electronic processors configured to perform the described functionality by executing instructions stored in a non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Relational terms such as first and second, top and bottom, and the like may be used herein solely to distinguish one entity or action from another entity or action without necessarily requiring or implying any actual such relationship or order between such entities or actions.

Figure 1:
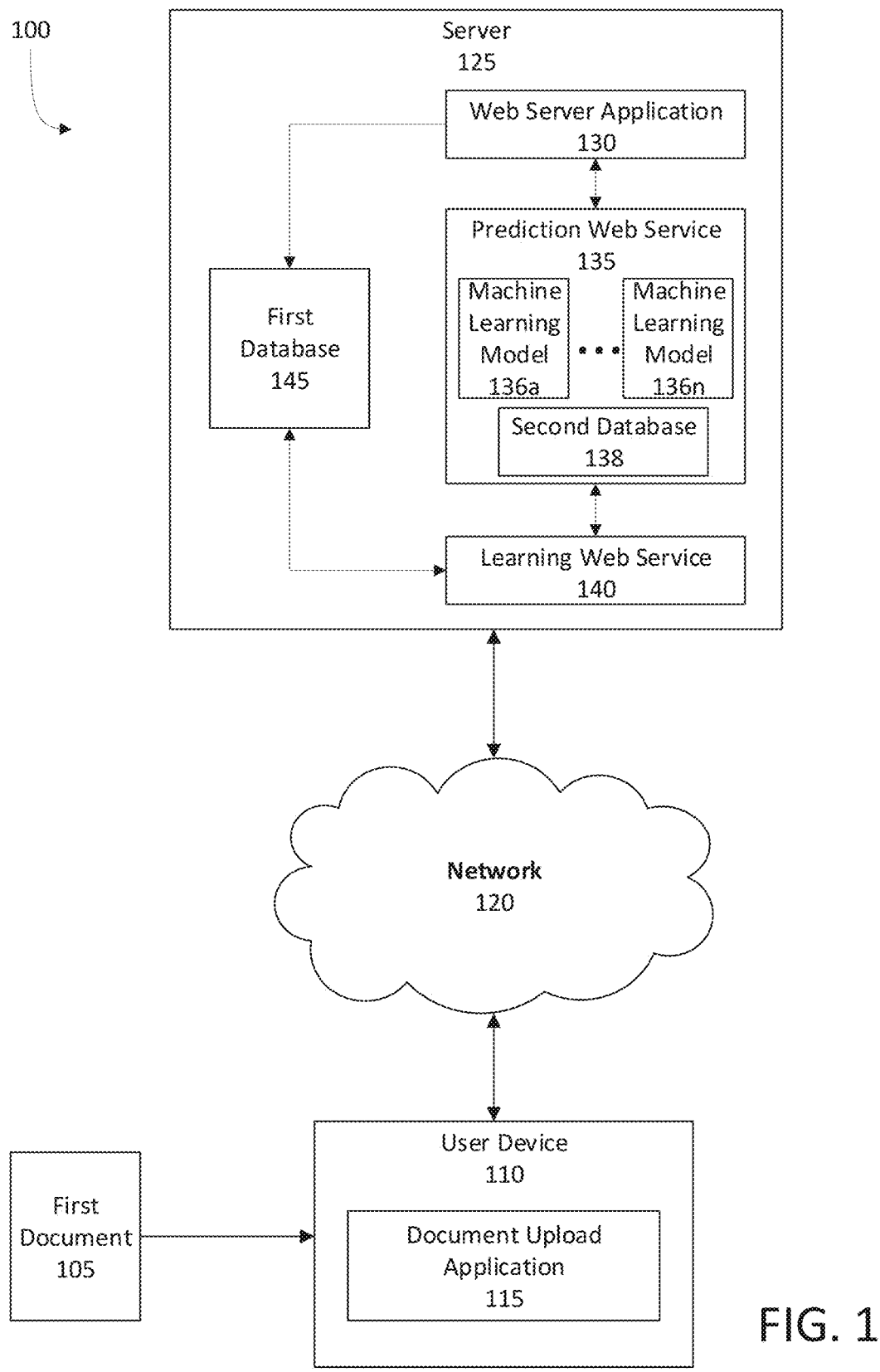
FIG. 1 is a block diagram of a system for automatically populating form fields in a document using a machine learning model according to some embodiments.

FIG. 1 is a block diagram illustrating one example of a system 100 for automatically populating form fields in a document using a machine learning model. In the example shown, the system includes a first document 105, a user device 110 including a document upload application 115, a network 120, a server 125 including a web server application 130, a prediction web service 135, a learning web service 140, and a first database 145. The user device 110 includes a display device and may be a personal desktop computer, a laptop computer, a tablet computer, a mobile phone, or other suitable computer or computing device.

It should also be understood that the system 100 illustrated in FIG. 1 is provided by way of example and the system 100 may include additional or fewer components and may combine components and divide one or more components into additional components. For example, the system 100 may include multiple user devices 110, networks 120, or servers 125 and various intermediary devices may exist between a user device 110 and the network 120. Additionally, the functions described herein with respect to the system 100 may be implemented solely by the user device 110, meaning that features and functions of the "cloud-type" system described in FIG. 1 could also be implemented locally in a user device or other local system.

The first document 105 may be an invoice, a sales order, an order confirmation, a remittance advice, and the like. In some embodiments, a first entity, such as a manufacturing company or service company generates the first document 105. The first document 105 may include multiple form fields. In some embodiments, a first form field is populated with a first value, such as a customer number or identifier (for example, a customer account identification number), a vendor identification number, a cost center code, or a tax code, and a second form field is empty. The first value may be specific to the first entity. In some embodiments, the first value may not be within the first document. The first value may be a value associated with the first entity but does not appear within the first document. For example, the first value may be an identifier obtained when the first document 105 is uploaded to the document upload application 115. The identifier may be a number or a combination of numbers and letters that corresponds specifically to the first entity. In some embodiments, the first entity generates and transmits multiple documents. In some embodiments, the first document 105 includes multiple pages. Each page may contain different, unrelated form fields. For example, a first page of the first document 105 may be a first invoice and a second page of the first document 105 may be a second invoice, different than the first invoice.

The entity may provide the first document 105 to the document upload application 115 within the user device 110. The document upload application 115 may be stored on, or accessible by, the user device 110. In some embodiments, the document upload application 115 is a secure application for uploading document(s), such as the first document 105, to the server 125.

The network 120 can include wired networks, wireless networks, or a combination thereof that enable communications between the various components in the system 100. In some configurations, the communication network 120 includes local area networks (LANs), wide area networks (WAN), mobile telephone networks (MTNs), and other types of networks, possibly used in conjunction with one another, to facilitate communication between the user device 110 and the server 125.

In the example shown, the server 125 includes the web server application 130, the prediction web service 135, and the learning web service 140. The server 125 includes a memory to store software (instructions) and an electronic processor coupled to the memory. The electronic processor may execute the instructions stored on the memory in order to populate form fields in a first document.

The web server application 130 communicates with the prediction web service 135 to populate the form fields of the first document 105. In some embodiments, the web server application 130 receives the first document 105 from the document upload application 115, via the network 120. The web server application 130 sends the first document 105, with the first value, to the prediction web service 135. In some embodiments, the web server application 130 may extract the first value from the first document and send the first value and the first document 105 to the prediction web service 135. Alternatively, or additionally, in some embodiments, the web server application 130 may identify the first value that is associated with the first entity and send the first value and the first document 105 to the prediction web service 135. The prediction web service 135 returns values to be populated into the form fields of the first document 105 by the web server application 130.

The prediction web service 135 includes machine learning models 136a . . . 136n and a second database 138. The prediction web service 135 uses the first value to determine a subset of validated documents that contains a most-similar document to the first document 105. The subsets of documents are stored within the prediction web service 135 in the second database 138. In some embodiments, the prediction web service 135 uses additional values to determine the subset of documents that contains the most-similar document to the first document 105. The prediction web service 135 uses machine learning models 136a . . . 136n to determine the most-similar document to the first document 105 from the subset of documents determined by the prediction web service 135. In some embodiments, each subset of documents includes a machine learning model 136a . . . 136n. For example, a first subset of documents includes a first machine learning model 136a and a second subset of documents includes a second machine learning model 136b. The machine learning model returns the values from the most-similar validated document to the web server application 130.

Machine learning generally refers to the ability of a computer program to learn without being explicitly programmed. In some embodiments, a computer program (for example, a learning model) is configured to construct an algorithm based on inputs. Supervised learning involves presenting a computer program with example inputs and their desired outputs. The computer program is configured to learn a general rule that maps the inputs to the outputs from the training data it receives. Example machine learning models include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

The first database 145 is a database that stores validated documents. In some embodiments, when the web server application 130 receives values and populates the form fields of the first document 105 with those values, a user may validate the first document via the user device 110. The web server application 130 may store the validated document in the first database 145.

The learning web service 140 updates the machine learning models 136a . . . 136n. The learning web service 140 may retrieve a validated document from the first database 145 and update the machine learning model 136a . . . 136n that is associated with the subset of documents that the validated document is associated with based on the first value. For example, the validated document containing the first value may have been populated with values from a first subset of documents within the prediction web service 135, such that the validated document is associated with the first subset of documents within the prediction web service 135 and the first subset of documents is updated by the learning web service 140.

In some embodiments, the learning web service 140 updates the machine learning models 136a . . . 136n according to a parameter, which in one example, is a schedule. For example, machine learning models 136a . . . 136n may be updated by the learning web service 140 every night, once a week, once a month, time of day, etc. In some embodiments, machine learning models 136a . . . 136n may be updated by the learning web service 140 according to a different parameter, for example, a number of documents received by the first database 145. For example, the learning web service 140 may update machine learning models 136a . . . 136n when a threshold number of documents (for example, 10, 20, 50, etc. documents) corresponding to a specific subset of documents are received by the first database 145.

Figure 2:
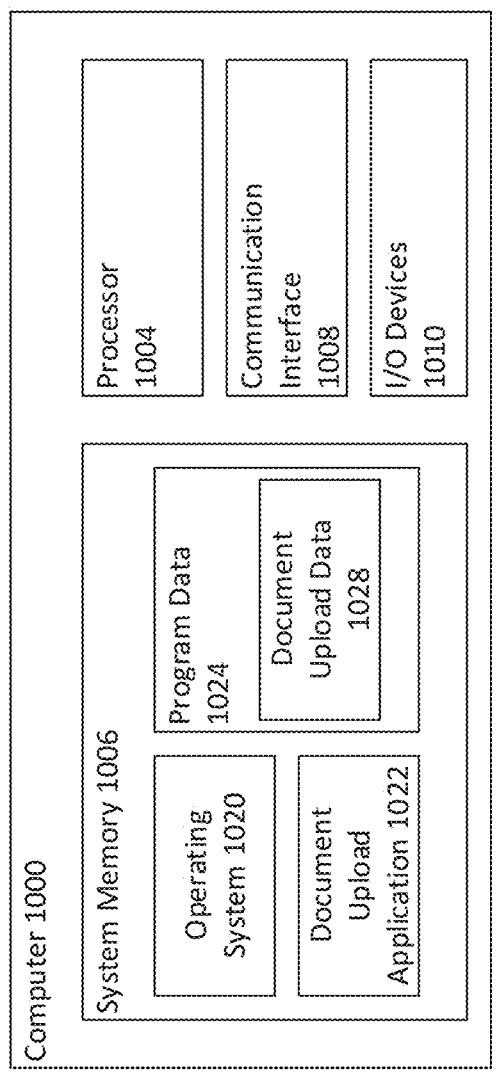
FIG. 2 is a block diagram of a computer according to some embodiments.

FIG. 2 is a block diagram of a computer 1000. In some embodiments, the user device 110 and/or the server 125 may include one or more components shown in computer 1000.

In some embodiments, the computer 1000 may include one or more processors 1004 and a system memory 1006. A memory bus may be used for communication between the processor 1004 and the system memory 1006.

The processor 1004 may be, for example, an electronic processor, a microprocessor (µP), a microcontroller (µC), a digital signal processor (DSP), or a combination thereof. The processor 1004 may include one more levels of caching, such as a level cache memory, a processor core, and registers. The processor core may include an arithmetic logic unit (ALU), a floating point unit (FPU), a digital signal processing core (DSP Core), or any combination thereof. A memory controller may also be used with the processor 1004, or in some implementations, the memory controller may be an internal part of the processor 1004.

Depending on the desired configuration, the system memory 1006 include, for example, volatile memory (such as RAM), non-volatile memory (such as ROM, flash memory, etc.), or a combination thereof. The system memory 1006 may include an operating system 1020, document upload application 1022, and program data 1024 which may include document upload data 1028. The document upload application 1022 may facilitate one or more operations and aspects described above regarding the user device 110 and/or the server 125. The document upload application 1022 alone or in combination, for example, with the operating system 1020, may generate a graphical user interface and components of the graphical user interface may be displayed on a display device associated with the computer 1000. Document upload data 1028 may comprise various aspects relating to a document to the be processed by the server 125, such as the number of documents and/or the number of form fields needing to be filled.

An example of the display device may include a hardware screen that may be communicatively coupled to the computer 1000. The display device may include a touch sensitive device that detects gestures such as a touch action. The display device may also provide feedback in response to detected gestures (or other form of input) via a user interface of the document upload application 1022, displayed by the touch sensitive device.

The computer 1000 may have additional features or functionality, and additional interfaces to facilitate communications between the basic configuration 1002 and other devices and interfaces. For example, a bus/interface controller may be used to facilitate communications between the system memory 1006 and the processor 1004, and one or more data storage devices via a storage interface bus. The data storage devices may be one or more removable storage devices, one or more non-removable storage devices or a combination thereof. The system memory 1006, the removable storage devices, and the non-removable storage devices are examples of computer storage media.

The computer 1000 may also include a communication interface 1008 for facilitating communication from various interface devices (for example, one or more I/O devices 1010 and/or communication devices) to the system memory 1006 and the processor 1004. Some of the example I/O devices 1010 may include a graphics processing unit and an audio processing unit, which may be configured to communicate to various external devices, such as a display, speakers, input devices (for example, keyboard, mouse, pen, voice input device, touch input device, etc.) or other devices (for example, printer, scanner, etc.) via one or more I/O ports. An example communication device may include a network controller, which may be arranged to facilitate communications with one or more other computers, servers, or databases over a network communication link via the communication interface 1008.

Figure 3:
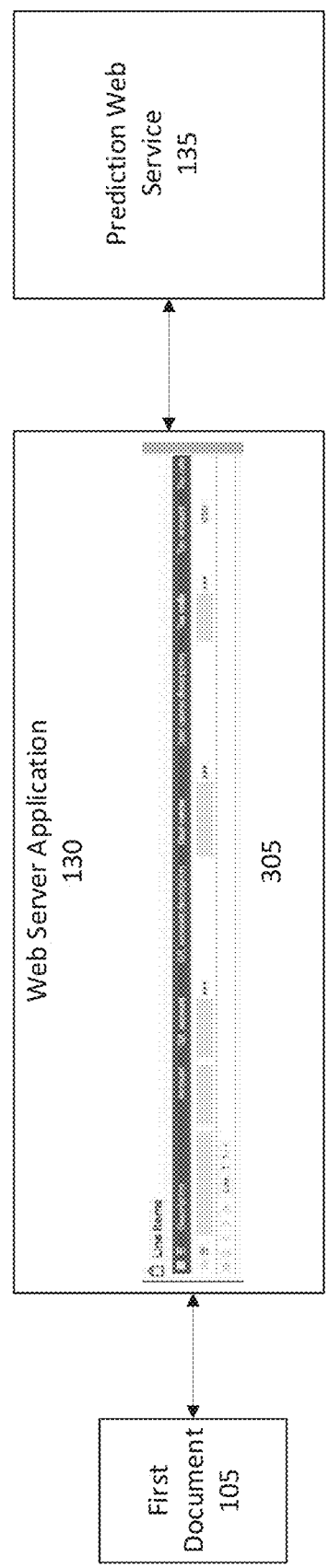
FIG. 3 is an illustration of a web server application interacting with components of the system of FIG. 1 according to some embodiments.

FIG. 3 is an illustration of the web server application 130 of the system 100. The web server application 130 interacts with the first document 105 and the prediction web service 135. The first document 105 uploaded to the document upload application 115 includes multiple form fields 305. In some embodiments, the multiple forms fields 305 include a first form field populated with a first value. The document upload application 115 sends the first document 105 and the first value to the web server application 130. The web server application 130 communicates with the prediction web service 135 to populate the unpopulated form fields of the multiple form fields 305. The web server application 130 sends the multiple form fields 305 and the first value to the prediction web service 135. The prediction web service 135 determines a most similar document to the first document 105 to be used to populate the unpopulated form fields of the multiple form fields 305. In some embodiments, the web server application 130 sends the multiple form fields 305 and data associated with the first document 105 to the prediction web service 135.

Figure 4:
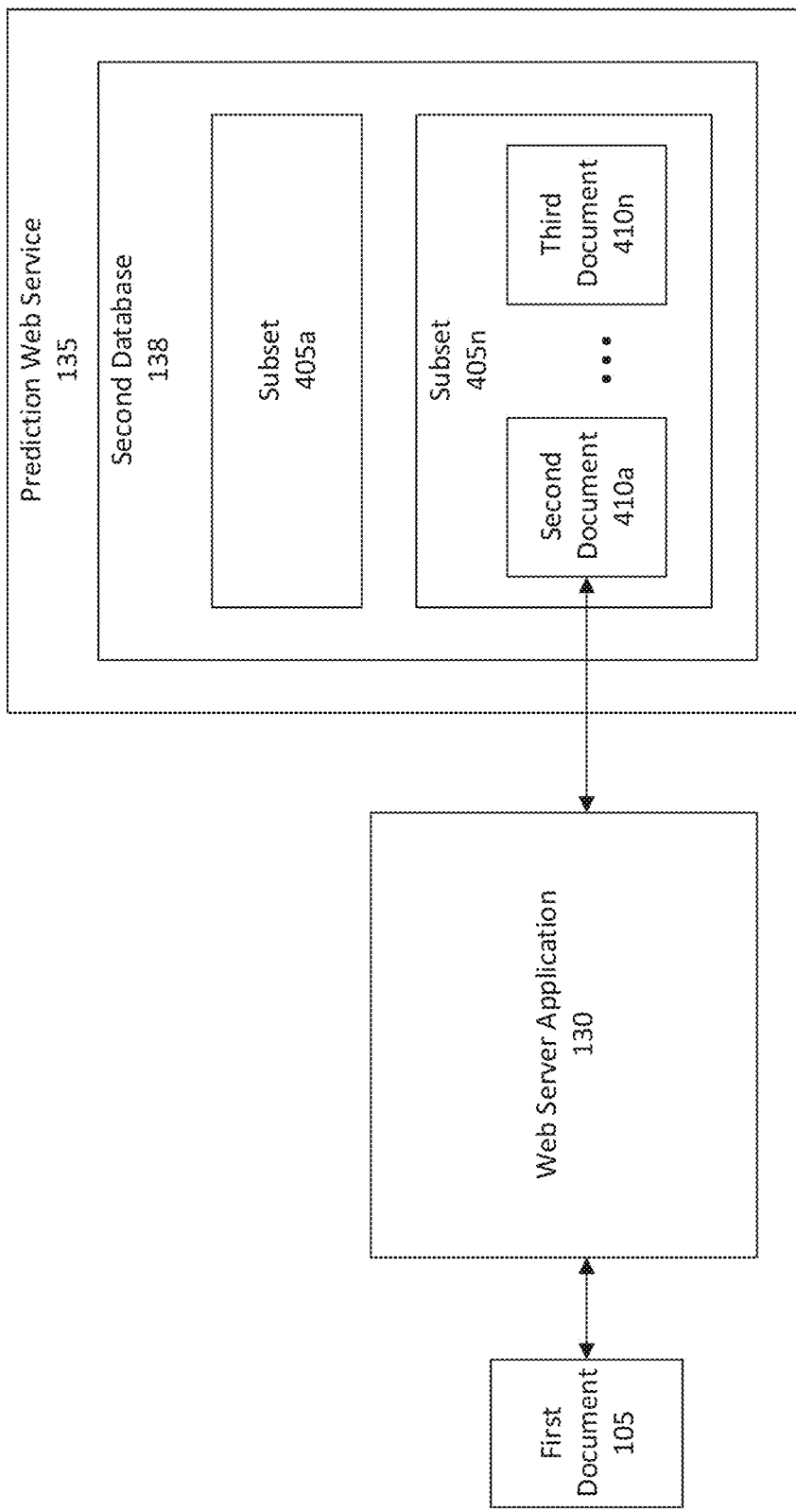
FIG. 4 is an illustration of the prediction web service of FIG. 3 interacting with components of the system of FIG. 1 according to some embodiments.

FIG. 4 is an illustration of the prediction web service 135 of the system 100. The prediction web service 135 interacts with the web server application 130 to populate the unpopulated form fields of the multiple form fields 305 of the first document 105.

The prediction web service 135 includes subsets of documents 405a . . . 405n. In some embodiments, each subset of documents 405a . . . 405n corresponds to a value associated with an entity, such as the first value, or data that is associated with an entity. Each subset 405a . . . 405n may include multiple documents. For example, the documents may be one of an invoice, a sales order, an order confirmation, a remittance advice, and the like. In some embodiments, the documents may be visually different than the first document 105, but still contain form fields that correspond to the multiple form fields 305 of the first document 105.

The prediction web service 135 determines which subset of documents from the subsets of documents 405a . . . 405n contains documents that are similar to the first document 105, based on the first value. For example, the first value may be associated with a first subset of documents 405a such that each document in the first subset of documents 405a contains the first value. In other words, each subset of documents is associated with an entity such that the subset of documents contains only documents that are relevant to or uploaded by that entity. The documents contained in each subset of documents 405a . . . 405n are validated documents, whose values may have been validated by a user.

Once the prediction web service 135 determines a subset of documents from the subsets of documents 405a . . . 405n that corresponds with the first value, the prediction web service 135 uses a machine learning model 136a . . . 136n to determine which document 410a . . . 410n is the most similar to the first document 105. In some embodiments, each subset of documents 405a . . . 405n includes a machine learning model 136a . . . 136n that is specific to that subset of documents 405a . . . 405n. For example, the subset of documents 405a includes a second machine learning model 136n and the subset of documents 405n includes a first machine learning model 136a. In some embodiments, model machine learning models 136a . . . 136n use a semantic approach (or semantic machine learning model) to determine which document within the subset of documents 405a . . . 405n is the most similar to the first document 105. For example, machine learning models 136a . . . 136n may be a support vector machine learning model that determines a level of accuracy with which each field of the multiple form fields 305 may be populated with validated data. In some embodiments, the level of accuracy may be in the range of 50-100%, with 100% meaning that a most similar document includes validated values corresponding to each form field of the multiple form fields 305.

Using the machine learning model 136a, the prediction web service 135 may extract a second document 410a from the subset of documents 405n, the second document 410a being the most similar document to the first document 105. For example, the second document 410a may contain the highest level of accuracy, as determined by the machine learning model 136a, compared to the other documents within the subset of documents 405n. The prediction web service 135 returns the values of the form fields from the second document 410a to the web server application 130. The web server application 130 populates the multiple form fields 305 with the values from the second document 410a, such that the first document 105 contains populated form fields 505.

Figure 5:
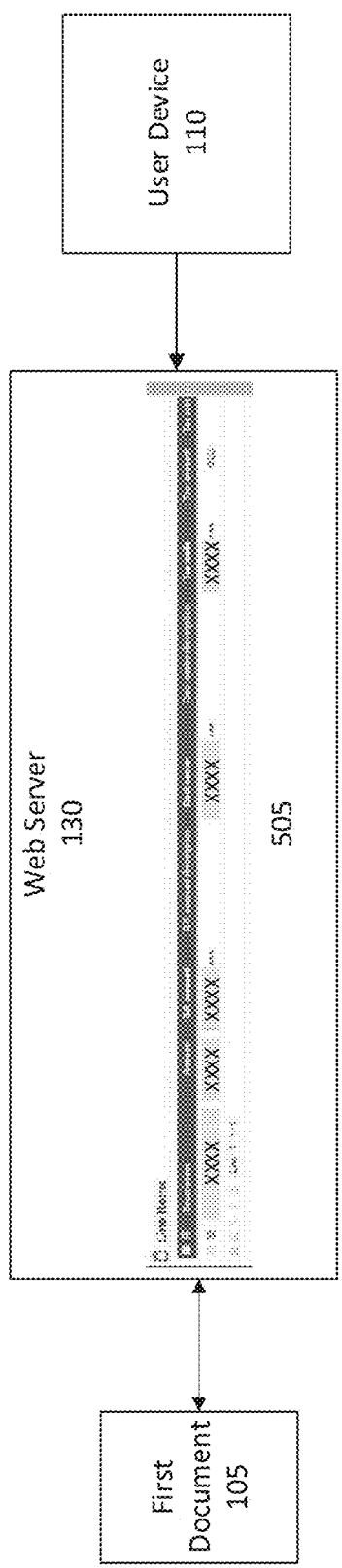
FIG. 5 is an illustration of the web server application interacting with components of the system of FIG. 1 according to some embodiments.

FIG. 5 is an illustration of the web server application 130 of the system 100. In some embodiments, once the web server application 130 populates the form fields of the first document 105, a user validates the values in the populated form fields 505 via the user device 110. For example, the user may use the user device 110 to confirm that the values in the populated form fields 505 are correct. In some embodiments, the user may edit a value in the populated form fields 505 prior to validating the values in the populated form fields 505. For example, the user may, via the user device 110, select a value and change the value to new value. The first document 105, including the validated values in the populated form fields 505, may be sent to the first database 145 to be stored.

Figure 6:
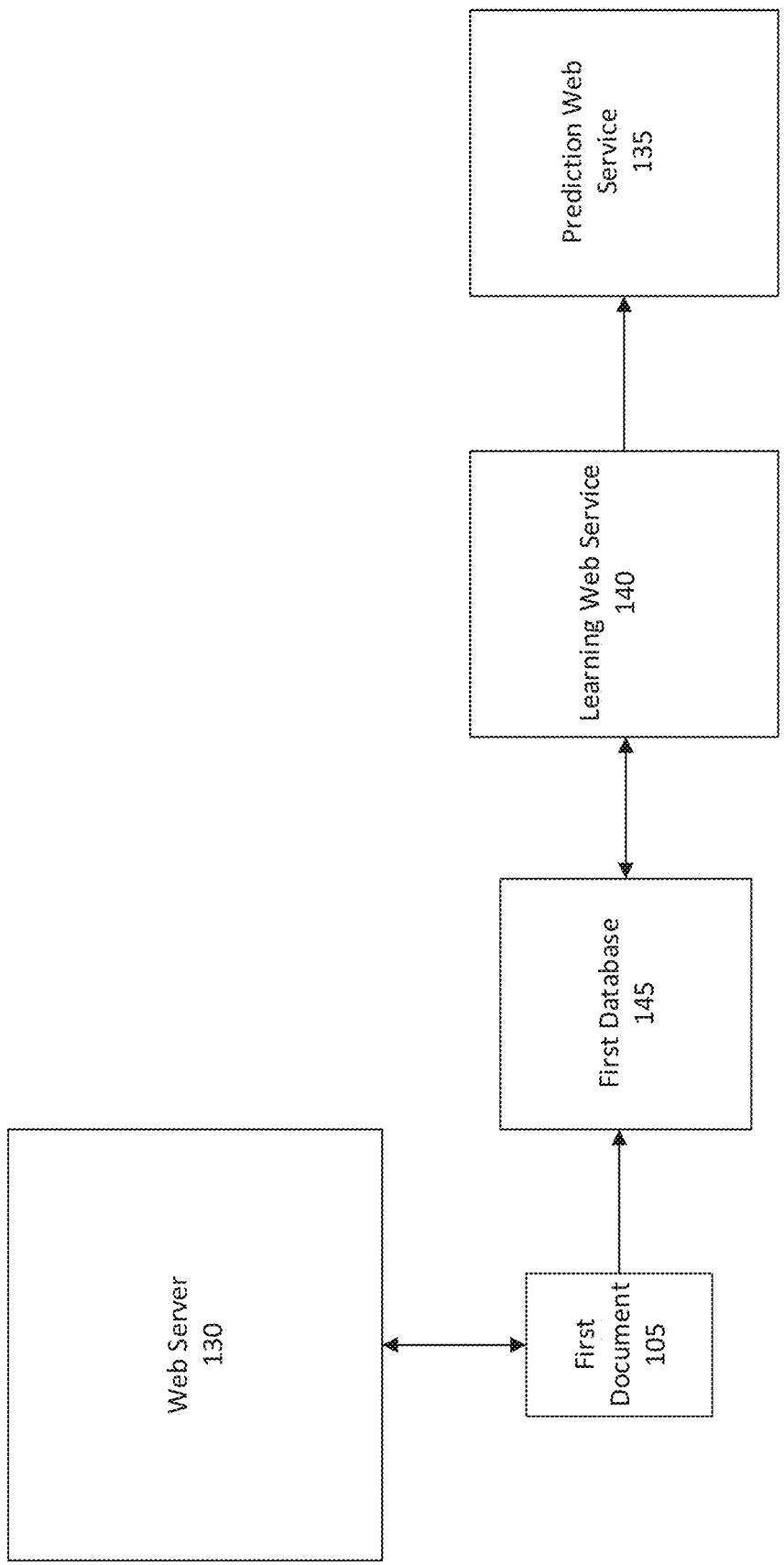
FIG. 6 is an illustration of a learning web service interacting with components of the system of FIG. 1 according to some embodiments.

FIG. 6 is an illustration of a learning web service 140 of the system 100. The web server application 130 may send the first document 105 with validated values in the populated form fields 505 to the first database 145. The first database 145 stores first document 105. In some embodiments, the first database 145 may store multiple documents that do not include similar values. For example, the first database 145 may store the validated first document 105 with a first value and a second document with a second, unrelated value to the first value.

The learning web service 140 may retrieve a validated document from the first database 145 and use the validated values in the validated document to update the machine learning models of the prediction web service 135. For example, the validated first document 105 is retrieved by the learning web service 140 and the learning web service 140 updates the machine learning model of the subset of documents 405n.

Figure 7:
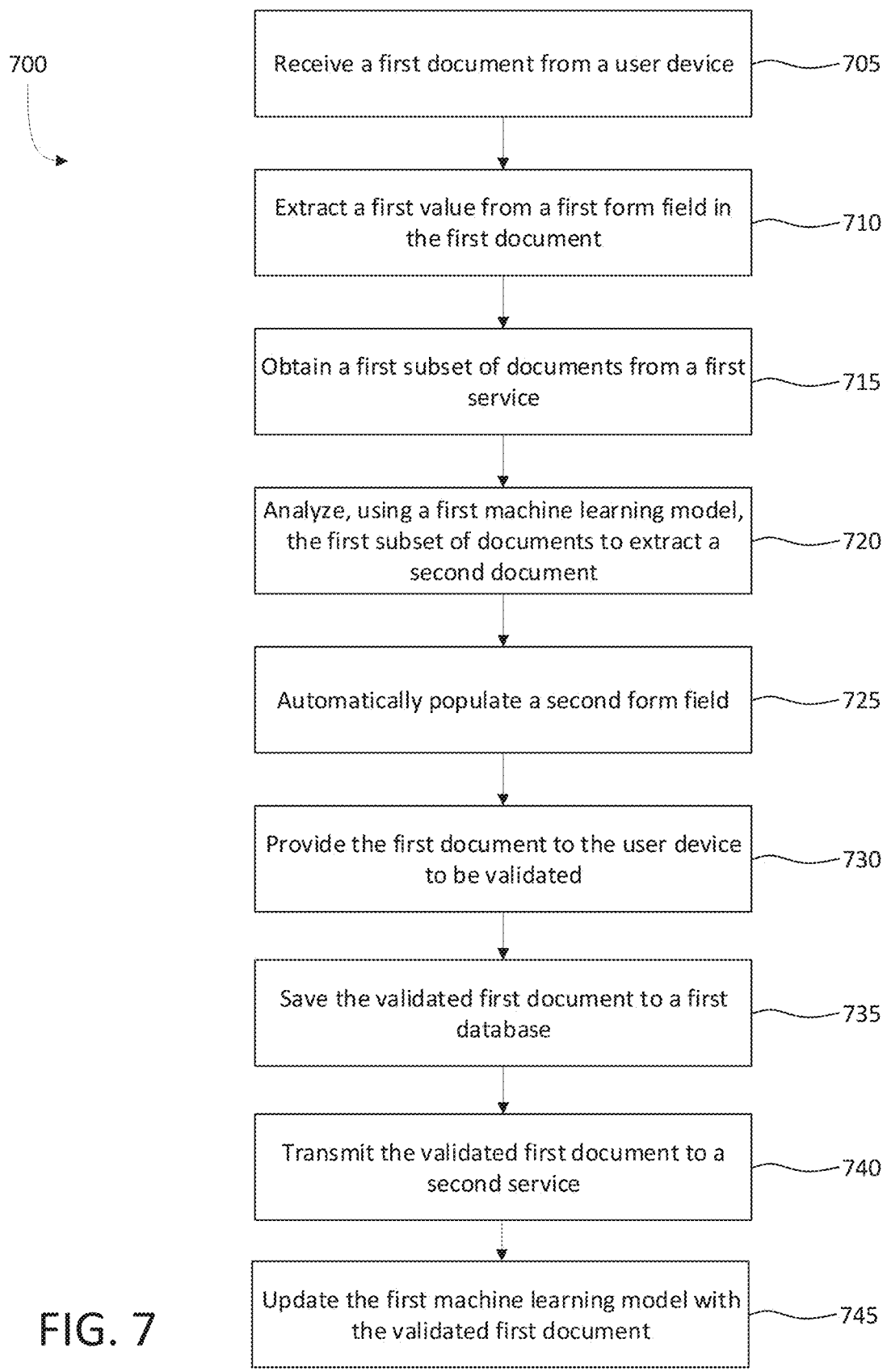
FIG. 7 is a flow chart of a method for automatically populating form fields according to some embodiments.

FIG. 7 is a flow chart of a method 700 for automatically populating form fields of a document, such as the first document 105. Method 700 may be performed by the server 125, user device 110, or a combination thereof.

At block 705, the electronic processor of the server 125 receives a first document from a user device. The first document 105 may be uploaded by the user device 110 via the document upload application 115 to the server 125. For example, the first document 105 may be an invoice, a sales order, an order confirmation, a remittance advice, and the like. The first document 105 may contain a plurality of form fields that may or may not be populated. For example, a first form field of the plurality of form fields may contain a first value and a second form field from the plurality of form fields may not be populated with a value.

At block 710, the electronic processor of the server 125 extracts the first value from the first form field in the first document. In some embodiments, the web server application 130 may extract the first value form the first form field in the first document 105. For example, the first value may be a customer number or identifier, a cost center, or a tax code, and a second form field may be empty. The first value may be specific to a first entity.

At block 715, the electronic processor of the server 125 obtains a first subset of documents from a first service. For example, the first service may be the prediction web service 135. In some embodiments, the prediction web service 135 may use the first value to filter through subsets of documents 405a . . . 405n to obtain a first subset of documents, such as the subset of documents 405n.

At block 720, the electronic processor of the server 125 analyzes, using a first machine learning model, the first subset of documents to extract a second document. In some embodiments, the prediction web service 135 uses the first machine learning model, such as machine learning model 136a, to extract a second document, such as second document 410a, from a plurality of documents 410a . . . 410n within the first subset of documents 405n. For example, the first machine learning model may be specific to the first subset of documents 405n, such that the first machine learning model corresponds to the first subset 405n. The second document 410a may include multiple populated form fields. For example, a third form field may contain the first value and a fourth form field may contain a second value. The second value may be validated value. For example, the second value may be a validated value based on the second document being a validated document.

At block 725, the electronic processor of the server 125 automatically populates the second form field. For example, the second form field may be populated with the second value from the second document 410a to create a populated form field. In some embodiments, form fields of the plurality of form fields of the first document 105 may be populated with validated values from the populated form fields of the second document 410a. In embodiments, at least one of the validated values from the form fields of the second document 410a may not have been the correct value to populate at least one of the plurality of form fields of the first document 105. For example, a validated value may have been changed, updated, or no longer in use since the prediction web service 135 obtained the second document 410a.

At block 730, the electronic processor of the server 125 provides the first document to the user device to be validated. In some embodiments, the first document 105 is displayed on a screen of the user device 110. A user may interact with the first document 105 displayed on the screen of the user device 110 to validate the first document 105. In some embodiments, the user may edit a value in one of the populated form fields of the first document 105 prior to validating the first document 105. For example, the user may, via the user device 110, select a value in a populated form field and change the value to new value.

At block 735, the electronic processor of the server 125 saves the validated first document to a first database. For example, the electronic processor of the server 125 saves the validated first document 105 to the first database 145. The first database 145 stores the validated first document 105.

At block 740, the electronic processor of the server 125 transmits the validated first document to a second service. For example, the second service may be the learning web service 140. In some embodiments, the learning web service 140 may retrieve the first document 105 from the first database 145.

At block 745, the electronic processor of the server 125 updates the first machine learning model with the validated first document. For example, the learning web service 140 may update the first machine learning model 136a of the prediction web service 135 using the validated first document 105. In some embodiments, the learning web service 140 may perform the updating of the first machine learning model 136a according to a schedule. For example, the first machine learning model may be updated by the learning web service 140 according to a number of validated documents containing a first value corresponding to the first subset received by the first database 145. For example, the learning web service 140 may update the first machine learning model when 10, 20, 50, etc. validated documents corresponding to the first subset are received by the first database 145.

Accordingly, embodiments described herein provide, among other things, systems and methods for the automatic population of form fields in a document using a machine learning model. Various features and advantages of some embodiments are set forth in the following claims.

What is claimed:

1. A method of processing a first document using a first service including a first machine learning model, the method comprising:
receiving, over a network from a first entity, the first document, wherein the first document includes a first form field;
identifying a first value associated with the first entity;
obtaining a first subset of documents from the first service, wherein each document included in the first subset of documents contains the first value;
analyzing, using the first machine learning model, the first subset of documents to extract a second document, wherein the second document includes a second form field containing the first value and a third form field containing a second value;

automatically populating the first form field with one selected from the group consisting of the first value and the second value;

providing, via a graphical user interface, the first document to a user to be validated;

saving, in response to the first document being validated, a validated first document to a database;

transmitting the validated first document to a second service; and in response to transmitting the validated first document to the second service, updating, based on a parameter, the first machine learning model with the validated first document.

2. The method of claim 1, wherein the parameter is at least one selected from the group consisting of a threshold number of documents saved to the database and a time of day.

3. The method of claim 1, wherein identifying a first value associated with the first entity includes extracting the first value from the first document.

4. The method of claim 1, wherein the first machine learning model is associated with the first subset of documents.

5. The method of claim 1 further comprising:
receiving, in response to the user not validating the first document, an edit to the second value via the graphical user interface.

6. The method of claim 1, wherein each document contained within the first subset of documents is a validated document.

7. The method of claim 1, wherein the first value is at least one selected from the group consisting of a customer account identification number and a vendor identification number.

8. The method of claim 1, wherein the first machine learning model is a semantic machine learning model.

9. The method of claim 1, wherein the first document is one of an invoice, a sales order, an order confirmation, and a remittance advice.

10. A system for processing a first document using a first service including a first machine learning model, the system comprising:
an electronic processor configured to
receive, over a network, the first document, wherein the first document includes a first form field containing a first value and a second form field not containing a value,
extract the first value from the first form field,
obtain a first subset of documents from the first service, wherein each document included in the first subset of documents contains the first value,
analyze, using the first machine learning model, the first subset of documents to extract a second document, wherein the second document includes a third form field containing the first value and a fourth form field containing a second value,
automatically populate the second form field with the second value,
provide, via a graphical user interface, the first document to a user to be validated,
save, in response to the first document being validated, a validated first document to a database,
transmit the validated first document to a second service, and
in response to transmitting the validated first document to the second service, update, based on a parameter, the first machine learning model with the validated first document.

11. The system of claim 10, wherein the parameter is at least one selected from the group consisting of a threshold number of documents saved to the database and a time of day.

12. The system of claim 10, wherein the electronic processor is further configured to:
receive, in response to the user not validating the first document, an edit to the second value via the graphical user interface.

13. The system of claim 10, wherein each document contained within the first subset of documents is a validated document.

14. The system of claim 10, wherein the first value is associated with a first entity.

15. A non-transitory computer-readable medium comprising instructions that, when executed by an electronic processor, causes the electronic processor to perform a set of operations comprising:
receiving, over a network from a first entity, a first document, wherein the first document includes a first form field;
identifying a first value associated with the first entity;
obtaining a first subset of documents from a first service, wherein each document included in the first subset of documents contains the first value;
analyzing, using a first machine learning model, the first subset of documents to extract a second document, wherein the second document includes a second form field containing the first value and a third form field containing a second value;
automatically populating the first form field with one selected from the group consisting of the first value and the second value;
providing, via a graphical user interface, the first document to a user to be validated;
saving, in response to the first document being validated, a validated first document to a database;
transmitting the validated first document to a second service; and
in response to transmitting the validated first document to the second service, updating, based on a parameter, the first machine learning model with the validated first document.

16. The non-transitory computer-readable medium of claim 15, wherein the parameter is at least one selected from the group consisting of a threshold number of documents saved to the database and a time of day.

17. The non-transitory computer-readable medium of claim 15, wherein the set of operations further includes receiving, in response to the user not validating the first document, an edit to the second value via the graphical user interface.

18. The system of claim 10, wherein the first machine learning model is a semantic machine learning model.

19. The non-transitory computer-readable medium of claim 15, wherein the first machine learning model is associated with the first subset of documents.

20. The non-transitory computer-readable medium of claim 15, wherein the first value does not appear within the first document.

* * * * *